US008873863B2

(12) United States Patent
Park et al.

(10) Patent No.: US 8,873,863 B2
(45) Date of Patent: Oct. 28, 2014

(54) SYSTEM AND METHOD FOR FINGERPRINTING FOR COMICS (71) Applicant: Electronics and Telecommunications Research Institute, Daejeon (KR)

(72) Inventors: Jee Hyun Park, Daejeon (KR); Yong Suk Yoon, Daejeon (KR); Sang Kwang Lee, Daejeon (KR); Jung Hyun Kim, Daejeon (KR); Seung Jae Lee, Daejeon (KR); Sung Min Kim, Daejeon (KR); Yong Seok Seo, Daejeon (KR); Jung Ho Lee, Wonju (KR); Young Ho Suh, Daejeon (KR); Won Young Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 131 days.

(21) Appl. No.: 13/651,271

(22) Filed: Oct. 12, 2012

(65) Prior Publication Data

US 2013/0142433 A1    Jun. 6, 2013

(30) Foreign Application Priority Data

Dec. 5, 2011    (KR) .......................... 10-2011-0128934

(51) Int. Cl.
*G06K 9/46*    (2006.01)
(52) U.S. Cl.
USPC ........... 382/195; 382/312; 382/218; 382/209; 382/181
(58) Field of Classification Search
CPC ...... G06T 7/0081; G06T 5/001; H04N 1/193; H04N 9/045; G06K 9/6202; G06K 9/6203; G06K 9/00
USPC .......................... 382/195, 312, 218, 209, 181
See application file for complete search history.

(56) References Cited

U.S. PATENT DOCUMENTS

2009/0164213 A1*    6/2009    Lennington et al. .......... 704/231

FOREIGN PATENT DOCUMENTS

| JP | 2011-059504 A | 3/2011 |
| JP | 2011-128924 | * 6/2011 |
| KR | 1020080111376 A | 12/2008 |
| KR | 1020090109215 A | 10/2009 |
| KR | 1020100050110 A | 5/2010 |
| KR | 1020110012740 A | 2/2011 |

OTHER PUBLICATIONS

Hoashi et al, An English machine translation of JP2011-128924, 2011.*

* cited by examiner

*Primary Examiner* — Ruiping Li (57) ABSTRACT

The present disclosure relates to a system and a method for finger printing for comics. A system for searching comics according to the present disclosure includes: a fingerprint database storing fingerprints extracted from comics, a comics fingerprint extraction unit extracting fingerprints configured of at least one of box frames, cuts, and speech bubbles included in input comic images, a fingerprint based candidate group search unit searching candidate groups among comics stored in the fingerprint database using the extracted fingerprints, and a similarity measuring unit measuring similarity between the searched candidate groups and the comic images corresponding to the extracted fingerprints.

10 Claims, 7 Drawing Sheets

SYSTEM AND METHOD FOR FINGERPRINTING FOR COMICS

CROSS-REFERENCE TO RELATED APPLICATIONS

This application is based on and claims priority from Korean Patent Application No. 10-2011-0128934, filed on Dec. 5, 2011, with the Korean Intellectual Property Office, the disclosure of which is incorporated herein in its entirety by reference.

TECHNICAL FIELD

The present disclosure relates to a system and a method for finger printing for comics, and more particularly, to a method for searching and identifying, by using fingerprints, comics acquired by various methods, such as a file generated by storing digital comics distributed in an image file type, a file generated by capturing digital comics using a screen capture function, a file generated by scanning real comics or photographing real comics using a digital camera, and the like, and a system and a method for preventing illegally shared comics from being shared by the identification results so as to protect a copyright of comics.

BACKGROUND

With the development of digital content technologies and the development of data transmission media, an exchange of data and an amount of information have been suddenly increased. Generally, various types of digital contents such as movie, music, document, picture, and the like, are produced and shared and rapidly distributed by the Internet, P2P, web hard, such that contents can be easily acquired. A social problem due to the sharing of the contents is the very infringement of right of a copyrighter caused by the illegal sharing of digital contents having a copyright. Due to examples of the infringement of copyright on the digital contents, technologies such as digital rights management (DRM), watermarking, finger printing, and the like, have been used to protect a right of a copyright holder and prevent a damage of a user. However, when copyrighted materials such as CDs, DVDs, and books are digitalized and shared by digital devices, a right of a copyright holder is not protected well and a damage of a user is not prevented.

In particular, in the case of comics, real publications are produced into digital contents and are mutually shared among users by illegal duplication and a copying process using a high-specification scanner or digital camera and therefore, a right of a copyright holder is frequently infringed.

Recently, technical protective measures for protecting a copyright is obligatory. Thus, in most online service providers (OSPs), a filtering technology using content recognition has been applied to music or video contents. Filtering is a technology of monitoring and filtering sound sources or videos that are illegally distributed using features, content deoxyribonucleic acid (DNA), or digital finger printing.

While the protective technology for monitoring and filtering illegal contents is not applied to comic contents due to the absence of related technologies.

Today, most sites serving comic contents through the Internet do not have an apparatus for preventing a simple illegal duplication such as screen capture, and the like, and only some thereof relatively safely protect a copyright of contents using an encryption technology or a capture prevention technology. However, when decrypting the encrypted content or bypassing the capture prevention technology, the comic contents may be illegally stored and distributed.

SUMMARY

The present disclosure has been made in an effort to provide a system and a method for finger printing capable of determining whether comics are illegal by searching and collecting illegally distributed publications and extracting fingerprints to compare the fingerprints with those of an original publication.

Further, the present disclosure has been made in an effort to provide a system and a method for finger printing capable of determining a copyright of contents by extracting features from a comics image and databasing information on corresponding copyrighted materials so as to be simply and rapidly searched, thereby protecting a right of a copyrighter and preventing a damage of a user when comics contents are digitalized and shared.

An exemplary embodiment of the present disclosure provides a method for searching comics including: extracting fingerprints configured of at least one of box frames, cuts, and speech bubbles included in input comic images; searching candidate groups among comics stored in a database using the extracted fingerprints; and measuring similarity between the searched candidate groups and the comic images corresponding to the extracted fingerprints.

Another exemplary embodiment of the present disclosure provides a system for searching comics including: a fingerprint database configured to store fingerprints extracted from comics, a comics fingerprint extraction unit configured to extract fingerprints configured of at least one of box frames, cuts, and speech bubbles included in input comic images, a fingerprint based candidate group search unit configured to search candidate groups among comics stored in the fingerprint database using the extracted fingerprints, and a similarity measuring unit configured to measure similarity between the searched candidate groups and the comic images corresponding to the extracted fingerprints.

Yet another exemplary embodiment of the present disclosure provides an apparatus for searching comics extracts fingerprints configured of at least one of box frames, cuts, speech bubbles included in input comic images and searches comics using similarity between the extracted fingerprints and fingerprints extracted from comics stored in a fingerprint database.

The system and method for finger printing according to the exemplary embodiment of the present disclosure can search and collect the illegally distributed digital comics and compare with the previously extracted fingerprints to determine whether the comics are illegally distributed. According to the exemplary embodiment of the present disclosure, the illegally distributed comics can be exterminated.

Further, the system and method for finger printing according to the exemplary embodiment of the present disclosure can also be used as the search system for finding out the information on the comics by using a part of the comics.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The exemplary embodiment of the present disclosure extracts fingerprints of comics with only some pages of digitalized comics to recognize the comics and search positions within the corresponding comics. In particular, in the condition in which encryption or packaging is released, when comics are illegally distributed through the Internet by various ways, the method of the present disclosure recognizes the illegal comics so as to block distribution.

Query fingerprints are extracted by a pre-processing process and a fingerprint extraction process for removing noise or smoothly extracting fingerprints from comics to be searched. The corresponding comics are recognized and it is determined whether a copyright is infringed, by querying the extracted fingerprints to a pre-built recognition system of cartoon publications.

Figure 1:
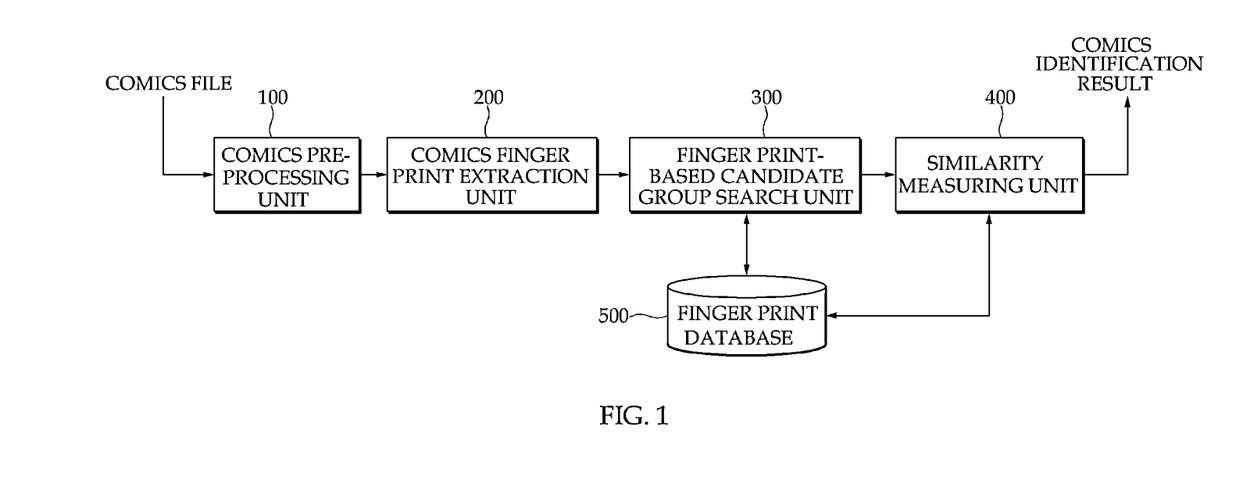
FIG. 1 is a diagram illustrating a configuration of a system for searching comics according to an exemplary embodiment of the present disclosure.

FIG. 1 illustrates an overall block diagram of a system for searching comics according to an exemplary embodiment of the present disclosure. Hereinafter, an operation of a system for searching comics will be described in detail with reference to FIG. 1.

Referring to FIG. 1, a system for searching comics includes a comics pre-processing unit 100, a comics fingerprint extraction unit 200, a fingerprint based candidate group search unit 300, a similarity measuring unit 400, and a fingerprint database 500. The system for searching comics may include other components in addition to the foregoing components.

First, various types of comic files are provided as an input. Various types mean several image coding methods. One page or two pages of a comic book are generated as a single image file. Therefore, a digitized form of a comic book consists of several image files. The image files may be present as a single compression file in a volume unit using a file compression method such as zip. In addition, since a set of comic books is configured of a volume or more, files of all of the comic books may be formed as a single compression file, or files compressed in a volume unit may be collected and again compressed to configure a set of all the comic books.

According to the exemplary embodiment of the present disclosure, since an input is an image file type, the compressed file as an input is decompressed so as to be formed as a bundle of the image files.

The comics pre-processing unit 100 performs a function of controlling an image so as to easily extract fingerprints from the received comics image files and converting the received files into files of an proper image type that can be processed by the comics fingerprint extraction unit 200.

The comics may include unnecessary information or a direction of the image may be changed, according to a method for digitalizing comics. For example, when intending to generate the comics as a digital file by a scan, the book is merely opened and two pages thereof are scanned at a time. In this case, an image distortion phenomenon such as bending of a middle portion of the book, generation of black noise, and the like, may occur. When two pages included in a single image file are not processed well and thus, are recognized as an image file including only one page, the fingerprints cannot be extracted well.

The distortion phenomenon of comics is mostly determined by a difference in a scanning method. Therefore, processing the correction operations at a time by the comics pre-processing unit helps improve the fingerprint extraction performance. That is, detecting and correcting the image distortion by the comics fingerprint extraction unit need to repeatedly perform the same operations of the pre-processing unit, which may be highly likely to degrade the fingerprint extraction performance.

The comics pre-processing unit 100 corrects an input image and cuts and normalizes only a region from which the fingerprints are extracted so as to be transmitted to the comics fingerprint extraction unit.

The comics fingerprint extraction unit 200 extracts the fingerprints that are attribute data owned by only the comics from the input comic images. The comics fingerprints may be extracted from an image of one page may be extracted over several pages, according to the image types. When the comics fingerprint extraction unit 200 extracts the fingerprints over several pages, the comics fingerprint extraction unit 200 can receive several pages as an input at a time and also extract the fingerprints by accumulating attribute values extracted from each page while receiving page by page.

The fingerprint based candidate group search unit 300 uses the fingerprint information extracted from the comics fingerprint extraction unit 200 to search the fingerprint database 500, thereby obtaining comic candidate groups. The comic candidate groups refer to a list of the comics having fingerprints similar to the received fingerprints and the comics finally identified among the candidate groups are determined.

As such, the reason why the two-stage searching of first obtaining the candidate groups and finally identifying the comics is performed is that it takes much time to search the entire database with detailed information. A rapid but not high-accurate searching method is first used to sort out the candidate groups and then, a method for sorting out the comics to be truly searched among the candidate groups with the detailed information, thereby considerably reducing the execution time.

The similarity measuring unit 400 receives the candidate groups as an input from the comics fingerprint search unit 300 to compare the similarity between the candidate groups and the comics to be searched, thereby finally identifying the comics. The comparison of the similarity between the candidate groups and the input comics may be made by comparing all the images or by comparing image features used by an image identification system.

The fingerprint database 500 serves to store and manage the fingerprints extracted from the comics.

Figure 2:
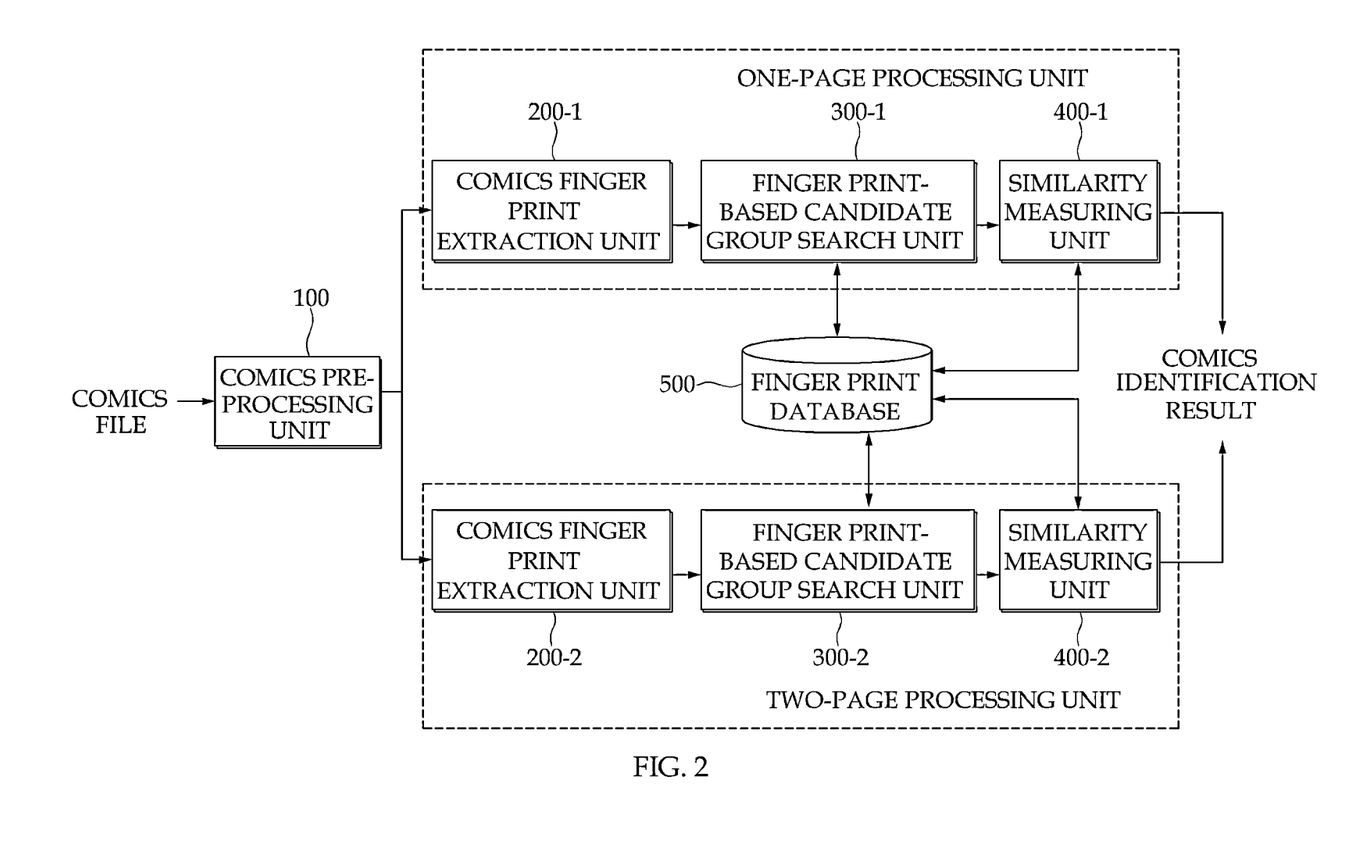
FIG. 2 is a diagram illustrating a configuration of a system for searching comics according to another exemplary embodiment of the present disclosure.

FIG. 2 illustrates a system for searching comics according to another exemplary embodiment of the present disclosure. That is, FIG. 2 illustrates a structure of a system for searching comics which differently processes the input image file according to whether the input image file has one page or two pages.

The comics pre-processing unit 100 determines whether the input image file has one page or two pages to give an input to a one-page processing unit in the case of an image configured of one page and an input to a two-page processing unit in the case of two pages, thereby identifying the comics. To this end, the system for searching comics includes a one-page processing unit that includes a comics fingerprint extraction unit 200-1, a fingerprint based candidate group search unit 300-1, and a similarity measuring unit 400-1 and a two-page processing unit that includes a comics fingerprint extraction unit 200-2, a fingerprint based candidate group search unit 300-2, and a similarity measuring unit 400-2.

The one-page processing unit performs operations of extracting the fingerprints, searching the fingerprints, and identifying the comics under the assumption that the input image has one page. Similarly, the two-page processing unit performs operations of extracting the fingerprints, searching the candidate groups, and measuring the similarity under the assumption that the input image has two pages.

It may be unnecessary for the system for searching comics to install a function of separating and processing the input image into one page and two pages in terms of costs, in some cases. A system having no need to process a large amount of comic files may be operated by including only a one-page or two-page processing unit. In this case, there is a need to perform an operation of changing the input images to meet the processing system. That is, in the system capable of processing only the one page, there is a need to perform an operation of first separating an image configured of two pages into images configured of one page so as to process the image configured of two pages. Similarly, in the system capable of processing only the two pages, there is a need to perform an operation of merging the two images configured of one page to generate the image configured of two pages so as to process the image configured of one page.

Figure 3:
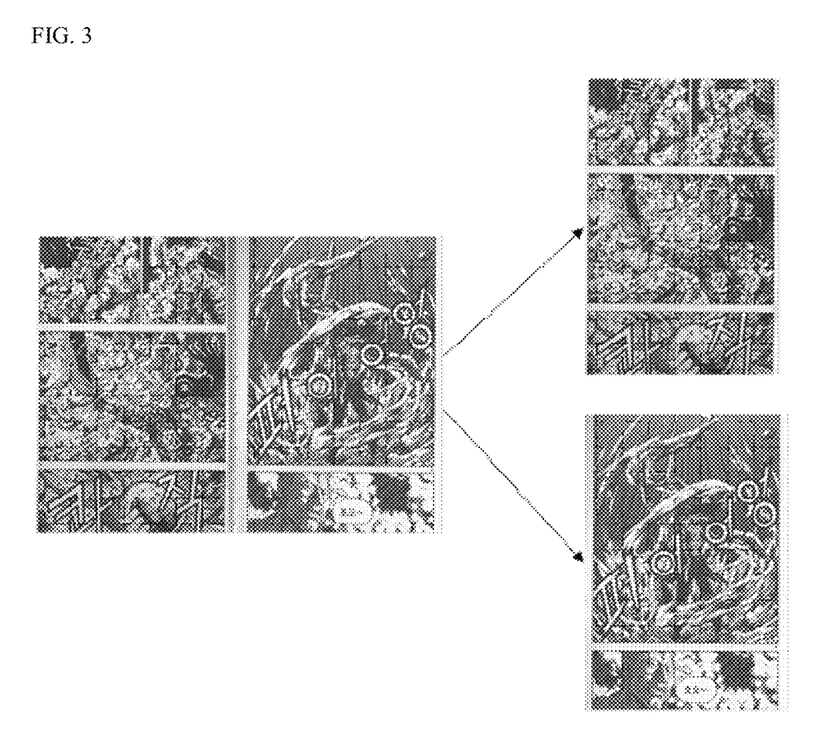
FIG. 3 is a diagram illustrating an example of separating pages of input comics in a comics pre-processing unit according to an exemplary embodiment of the present disclosure.
Figure 4:
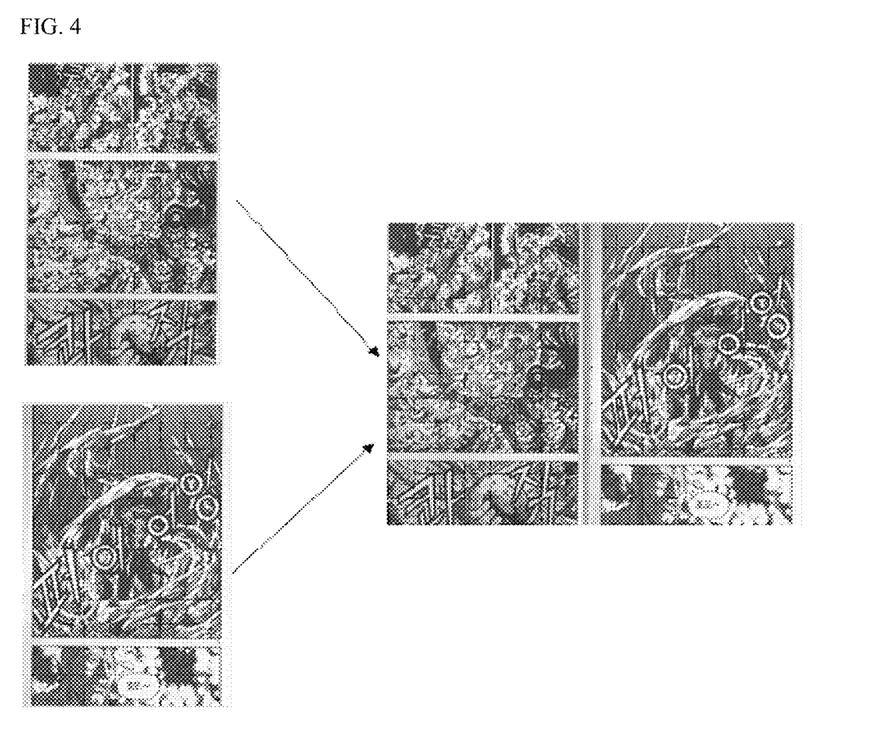
FIG. 4 is a diagram illustrating an example of merging the pages of the input comics in the comics pre-processing unit according to an exemplary embodiment of the present disclosure.

FIG. 3 illustrates an example of separating pages according to the exemplary embodiment of the present disclosure and FIG. 4 is a diagram illustrates an example of merging pages according to the exemplary embodiment of the present disclosure.

As described above, the comics pre-processing unit 100 serves to generate images suitable for the comics fingerprint extraction unit installed in FIGS. 3 and 4. That is, in case in which the comics fingerprint extraction unit processes the image configured of one page, the comics pre-processing unit separates pages of comics input as illustrated in FIG. 3 when the input comics are two pages. In case in which the comics fingerprint extraction unit processes the image configured of two pages, the comics pre-processing unit merges pages of comics input as illustrated in FIG. 4 when the input comics are one page.

Figure 5:
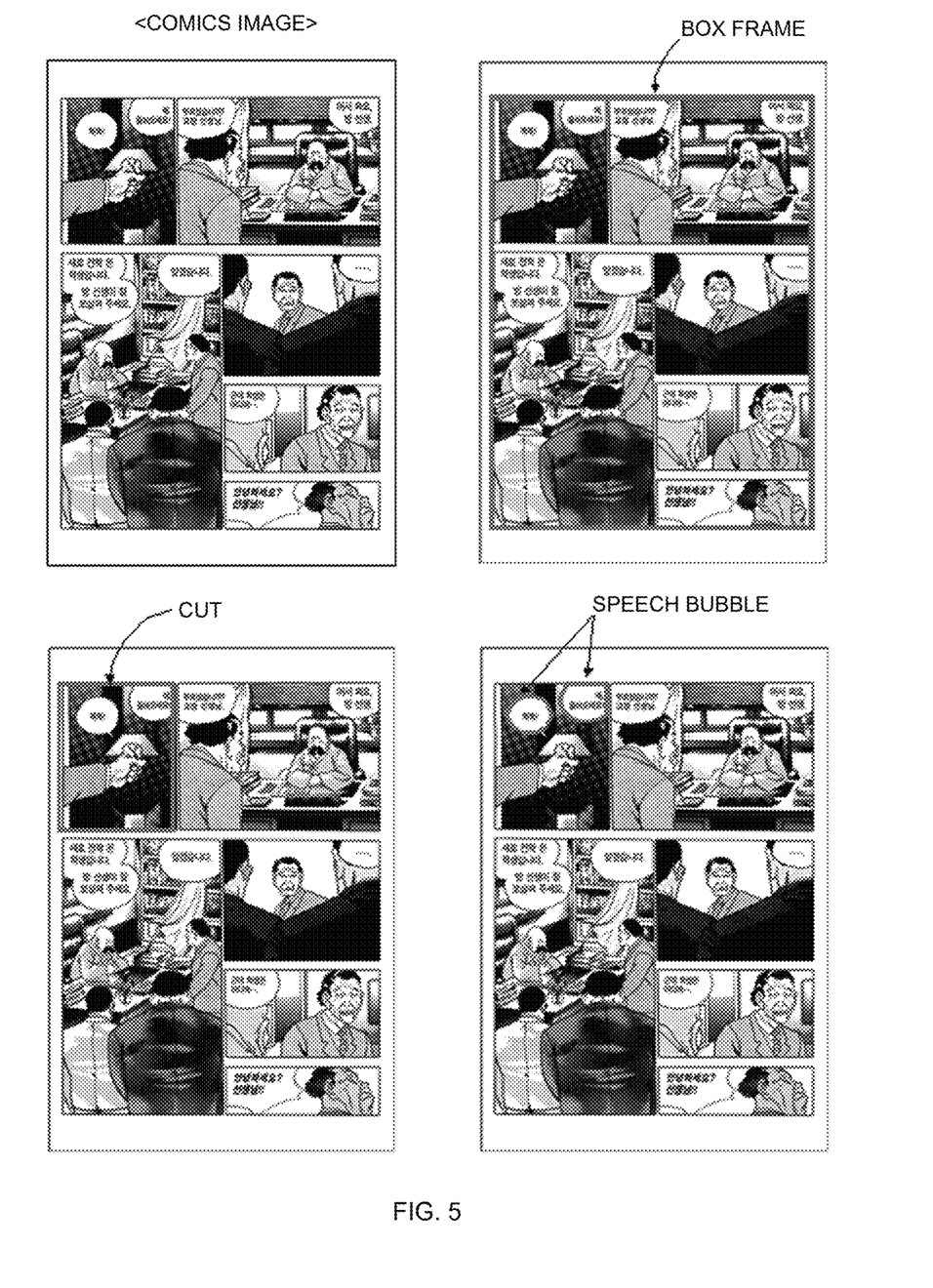
FIG. 5 is a diagram illustrating terms used in the comics images according to an exemplary embodiment of the present disclosure.

FIG. 5 illustrates an example of box frames, cuts, speech bubbles in the comic images for extracting the fingerprints according to the exemplary embodiment of the present disclosure. Hereinafter, the example of the box frames, the cuts, the speech bubbles in the comic images for extracting the fingerprints will be described with reference to FIG. 5.

Box Frame—the outermost rectangle including comic contents except for a blank in a sheet of comic image Cut—a region representing one scene in the comic image Speech Bubble—one region representing a dialogue in the comic image.

Figure 6:
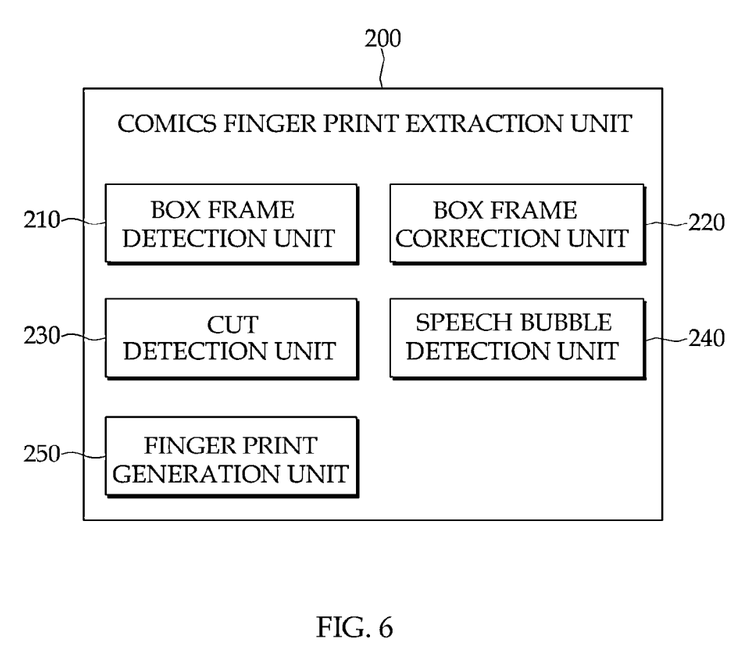
FIG. 6 is a diagram illustrating a configuration of a comics fingerprint detection unit.

FIG. 6 is a block diagram illustrating a configuration of the fingerprint extraction unit 200 extracting the fingerprints from the comic images according to the exemplary embodiment of the present disclosure. Hereinafter, a configuration of the fingerprint extraction unit extracting the fingerprints from the comic images according to the exemplary embodiment of the present disclosure will be described in detain with reference to FIG. 6.

Referring to FIG. 6, the comics fingerprint extraction unit 200 may include a box frame detection unit 210, a box frame correction unit 220, a cut detection unit 230, a speech bubble detection unit 240, and a fingerprint generation unit 250. Further, the comics fingerprint extraction unit may include other components in addition to the foregoing components.

The box frame detection unit 210 serves to detect an outermost edge (box) region including the comic contents from the input comic images. The box frame region correction unit 220 serves to correct the box frame region including the non-linear distortion input from the box frame detection unit 210 to a rectangular box frame region by using methods, such as image warping, and the like. The cut detection unit 230 serves to detect the cut region from the input comic images. The speech bubble detection unit 240 serves to detect the speech bubble region from the input comic images. The fingerprint generation unit 250 serves to generate the fingerprint information capable of identifying the comic images based on the input information such as boxes, cuts, speech bubbles, and the like.

Figure 7:
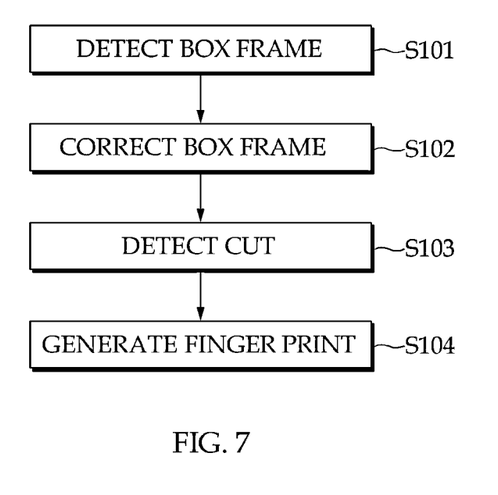
FIG. 7 is a flow chart illustrating a method for generating comics fingerprints.

FIG. 7 is a flow chart illustrating a process of generating the fingerprints by the comics fingerprint detection unit. Hereinafter, an operation performed by the comics fingerprint extraction unit will be described in detail with reference to FIG. 7.

The box frame detection unit 210 serves to detect an outermost edge (box) region including the comic contents from the input comic images and transmit the detected outermost edge region as an input to the box frame correction unit 120 (S101).

The box frame correction unit 120 serves to correct the box frame region including the non-linear distortion input from the box frame detection unit 110 to a rectangular box frame region by using methods, such as image warping, and the like, and transmit the corrected results as an input to the cut detection unit 130 (S102).

The cut detection unit 130 detects the cut region from the corrected box frame region and transmits the cut information as an input to the fingerprint generation unit 250 (S103).

The fingerprint generation unit 250 generates the fingerprints using the input cut information (S104).

A portion of the detailed components 210 to 250 included in the comics fingerprint extraction unit may not be included in the comics fingerprint detection unit 200 according to what method for generating fingerprints is used. For example, in the case of the method for generating image fingerprints in consideration of the comic contents in the box frames as a single image after detecting the box frames, the comics fingerprint detection unit 200 may not include the cut detection unit 230 and the speech bubble detection unit 240. That is, the comics fingerprint detection unit may detect the comics fingerprints using only a part of components configuring the comics fingerprint detection unit according to the used methods for generating fingerprints.

Figure 8:
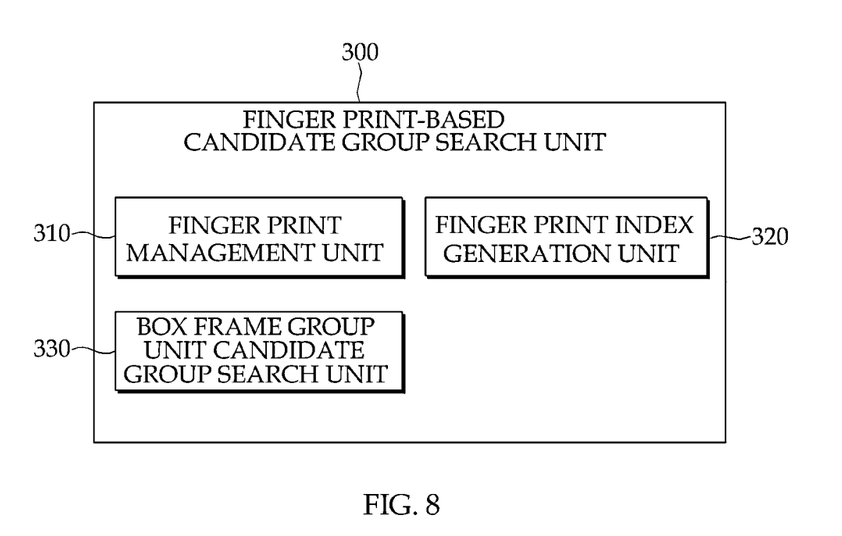
FIG. 8 is a diagram illustrating a configuration of a fingerprint based candidate group search unit.

FIG. 8 is a diagram conceptually illustrating a configuration 300 of a fingerprint based candidate group search unit 300 searching result candidate groups from a fingerprint DB using the comic fingerprints according to the exemplary embodiment of the present disclosure. Hereinafter, the configuration of the fingerprint based candidate group search unit searching the result candidate groups from the fingerprint DB using the comic fingerprint according to the exemplary embodiment of the present disclosure will be described in detail with reference to FIG. 8.

Referring to FIG. 8, the fingerprint based candidate group search unit 300 may include a fingerprint management unit 310, a fingerprint index generation unit 320, and a box frame group unit candidate group search unit 330. Further, the fingerprint based candidate group search unit may include other components in addition to the foregoing components.

The fingerprint management unit 310 serves to temporarily store the fingerprints transmitted from the fingerprint extraction unit 200. For searching the candidate groups, the comic images of several pages may be required. In this case, a fingerprint extractor needs to internally store the fingerprints when the fingerprint extractor sequentially transmits only the fingerprint for a single image. The fingerprints that are not required to search the candidate groups among the temporarily stored fingerprints are deleted.

The fingerprint index generation unit 320 serves to generate the index to be used to search the DB from the fingerprints so as to rapidly perform the DB search. The box frame group unit candidate group search unit 330 combines the fingerprints in a unit of several box frames to query the fingerprint DB. A single box frame is extracted from a single comic image and when the images of several pages are used at the time of searching the comics, the box frames extracted from each page are combined in a group unit to be used for search.

The similarity measuring unit 400 receives the candidate groups as an input from the comics fingerprint search unit 300 to compare the similarity with the comics to be searched, thereby finally identifying the comics. The technologies used for image similarity search, such as edge histogram descriptor (EHD), orthogonality mean projection feature (OMPF), Icon, covariant moment (CovM), thumbnail, and the like, may be used for similarity search.

The fingerprint database 500 serves to store and manage the fingerprints extracted from the comics. Further, various types of information, such as producers, publishing companies, title, summary, date of issue, ISBN, address, telephone, facsimile, and the like, may be stored and managed as the information on the comics. Further, the original comics may be stored for management and be coded at the time of security request and thus, all or a part thereof may be stored. As a database management system (DBMS), the corresponding system designer may use a commercial DBMS to meet a purpose of the system or may use the DBMS for special purposes.

Figure 9:
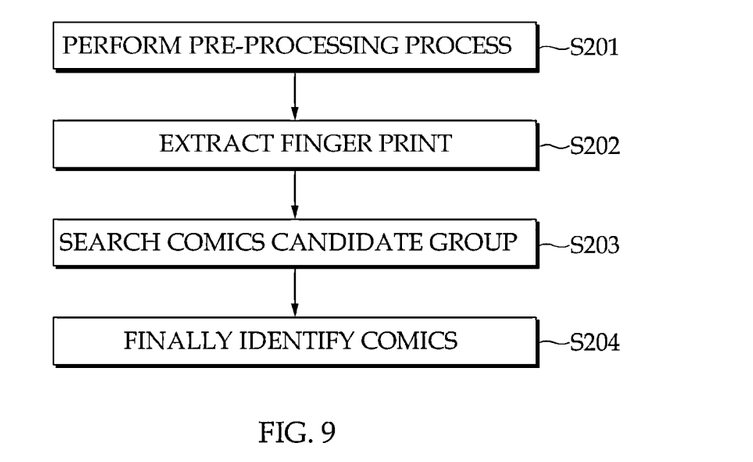
FIG. 9 is a flow chart illustrating operations performed in a system for searching comics according to an exemplary embodiment of the present disclosure.

FIG. 9 illustrates operations performed in the system for searching comics according to the exemplary embodiment of the present disclosure. Hereinafter, operations performed in the system for searching comics according to the exemplary embodiment of the present disclosure will be described in detail with reference to FIG. 9.

The comics pre-processing unit 100 corrects the input comic images and cuts and normalizes only the region from which the fingerprints are extracted so as to be transmitted to the comics fingerprint extraction unit 200 as an input (S201).

The comics fingerprint extraction unit 200 extracts the fingerprints that are attribute data owned by only the comic from the comic images input from the comics pre-processing unit 100 and transmits the results to the input of the fingerprint based candidate group search unit 300 (S202).

The fingerprint based candidate group search unit 300 uses the fingerprint information extracted from the comics fingerprint extraction unit 200 to search the fingerprint database 500, thereby searching the comics candidate groups (S203).

The similarity measuring unit 400 receives the candidate groups from the comics fingerprint search unit 300 to compare the similarity between the candidate groups and the comics to be searched, thereby finally identifying the comics (S204).

The foregoing comics fingerprint system and method may be used for a system for searching comics using the fingerprints or a system for identifying and filtering illegal comics among the comics distributed in an online service provider (OSP). The comics fingerprint system and method may be used in the devices having a small display such as smart phones using the method for detecting box frames and cuts so as to produce programs showing effectively the comics.

The foregoing method and apparatus for identifying comics may combine and configure the sub modules by various methods and may not include some of the sub modules.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for searching comics, comprising:
   correcting an input comic image before generating a fingerprint;
   extracting at least one of a box frame surrounding a single comic page, a cut defining a single comic panel, or a speech bubble of a comic panel in the corrected comic image;
   generating a fingerprint from the at least one box frame, cut, or speech bubble;
   searching candidate groups of comics stored in a database using the fingerprint; and
   measuring similarity between the input comic image and comics of the searched candidate group,
   wherein correcting the input coming image includes separating a single image into two images, each of the two images corresponding to a single comic page, or combining two input images into a single image corresponding to two comic pages.

2. The method of claim 1, wherein the input comic image is input as a compressed file, and the compressed file is released to generate the comic image.

3. The method of claim 2, wherein the fingerprints are extracted page by page or are extracted at least two pages by pages.

4. The method of claim 1, wherein generating the fingerprint includes:
   detecting box frames in the comic image;
   correcting the detected box frames; and
   generating a fingerprint from the detected box frames.

5. The method of claim 1, wherein the extracting of the fingerprints includes:
   detecting box frames in the comic image;
   correcting the detected box frames;

detecting cuts in the corrected box frames; and
generating a fingerprint from the detected cuts.

6. The method of claim 1, wherein the extracting of the fingerprints includes:
detecting box frames in the comic image;
correcting the detected box frames;
detecting cuts in the corrected box frames;
detecting speech bubbles in the detected cuts; and
generating a fingerprint from the detected speech bubbles.

7. A system for searching comics, comprising:
a comics pre-processing unit configured to correct an input comic image before generating a fingerprint;
a comics fingerprint extraction unit configured to extract at least one of a box frame, a cut, and a speech bubble included in the corrected input comic image and to generate a fingerprint from the at least one box frame, cut, or speech bubble;
a fingerprint based candidate group search unit configured to search candidate groups among comics stored in a fingerprint database using the fingerprint; and
a similarity measuring unit configured to measure similarity between the searched candidate groups and the input comic image,
wherein the pre-processing unit separates one page configured of at least two input images into two pages or merges two pages into one page.

8. The system of claim 7, wherein the fingerprint extraction unit includes:
a box frame detection unit configured to detect the box frames from the input comic images; and
a box frame correction unit configured to correct the detected box frames.

9. The system of claim 7, wherein the fingerprint extraction unit includes:
a cut detection unit configured to detect the cuts from the corrected box frames; and
a speech bubble detection unit configured to detect the speech bubbles from the detected cuts.

10. The system of claim 7, wherein the fingerprint based candidate group search unit includes:
a fingerprint management unit configured to temporarily store the fingerprints transmitted from the fingerprint extraction unit;
a fingerprint index generation unit configured to generate an index used for search from the stored fingerprints;
a box frame group unit candidate group search unit configured to search the candidate groups from the fingerprint database using the fingerprint index generated in a unit of a plurality of box frames.

* * * * *